United States Patent [19]

Garcia et al.

[11] Patent Number: 5,954,833

[45] Date of Patent: Sep. 21, 1999

[54] DECENTRALIZED REDUNDANCY DETECTION CIRCUIT AND METHOD OF OPERATION THEREOF

[75] Inventors: Richard R. Garcia; Gabriel G. Suranyi, both of Plano, Tex.

[73] Assignee: Lucent Technologies Inc., Murray Hill, N.J.

[21] Appl. No.: 08/902,055

[22] Filed: Jul. 29, 1997

[51] Int. Cl.[6] .............................. G01R 31/30; G06F 11/00

[52] U.S. Cl. ............................................. 714/745; 714/22

[58] Field of Search ............................. 371/28, 2.1, 22.1; 395/182.2; 714/745, 701, 724, 22

[56] References Cited

U.S. PATENT DOCUMENTS 5,745,356   4/1998   Tassitino, Jr. et al. .................... 363/71
5,802,859   9/1998   Zugibe ...................................... 62/125

*Primary Examiner*—Phung M. Chung

[57] ABSTRACT

For use in a module, a redundancy detection circuit for, and method of, determining whether a predetermined adequate redundancy exists when the module is present in a system. In one embodiment, the module includes: (1) a sensor, associated with the module, that receives a signal that is a function of a number of modules present in the system and (2) a calculation circuit, coupled to the sensor, that determines from the signal whether a surplus capacity of the module provides at least the predetermined adequate redundancy for the system.

20 Claims, 2 Drawing Sheets

5,954,833

DECENTRALIZED REDUNDANCY DETECTION CIRCUIT AND METHOD OF OPERATION THEREOF

TECHNICAL FIELD OF THE INVENTION

The present invention is directed, in general, to electronic controls and, more specifically, to a decentralized circuit for determining whether adequate redundancy is present in a modular electronic system.

BACKGROUND OF THE INVENTION

The traditional availability of telecommunication systems that users have come to expect and rely upon is based in part on the redundant configuration of power supplies. Redundancy provides a system with the ability to function even when, for instance, one power supply module or rectifier fails. Computer systems, including servers and workstations, are migrating toward high end availability and are incorporating redundant power capability as users become less tolerant of loss of service due to power supply failure.

Redundant power systems, also known as high availability systems or "n+1" systems, are based on the principle that a system contains at least one more rectifier than is required. If one rectifier either fails or is taken off-line, the remaining rectifiers have enough reserve capacity to meet the power requirements of the system. A single rectifier failure, therefore, will not disable the entire system. At most, it may cause the remaining rectifiers to operate at full capacity.

Current designs using "n+1" redundancy are based on an external controller that monitors each rectifier in the system. The external controllers receive information on the individual rectifier's source output current. The controller determines the number of rectifiers in the system and, using the actual source output current and the maximum available output current from each rectifier, verifies whether the current sourced by each rectifier is sufficiently below the redundancy threshold. The existence of the "n+1" redundancy condition guarantees that if one rectifier fails, the remaining rectifiers will have enough reserve capacity to meet the power consumption of the system.

The use of external controllers for determining redundancy is sound for high-end systems. With the expansion of the cost sensitive telecommunications and computer systems market, however, many customers are purchasing basic systems and expanding them as their needs require. The basic systems typically contain only a small number of rectifiers whereby each rectifier carries a significant portion of the total system load. This results in greater need for protection since without redundancy, failure of one rectifier will generally result in adverse effects on the operation of the overall system. In systems containing a large number of rectifiers, the percentage of the total load carried by each rectifier is smaller. Failure of one rectifier will have a significantly less, even negligible, impact on the system's operation. Due to the greater impact of a rectifier failure on the basic systems, cost sensitive customers who require redundancy protection are severely disadvantaged by the current method of using an external controller to determine redundancy status.

Telecommunications and computer systems are often sold with growth in mind. As business grows, the customer can expand the system processing power as necessary. Power consumption increases as more equipment is added to a system, necessitating the use of additional rectifiers. If the system contains a controller, the customer can easily determine whether he has a sufficient number of rectifiers to ensure redundancy. Some customers, however, cannot afford the added cost of a redundancy controller. Currently, a customer lacking the resources to purchase a redundant controller has two options. The customer may either estimate the number of rectifiers required, or alternatively, the customer may add more rectifiers than necessary in order to ensure redundancy. The first option does not offer a guarantee of redundancy, while the latter may result in greater cost to the customer if more rectifiers are employed than is necessary for redundancy.

What is needed in the art is a system and method for determining redundancy in a decentralized fashion, without requiring the use of an external controller.

SUMMARY OF THE INVENTION

To address the above-discussed deficiencies of the prior art, the present invention provides, for use in a module, a redundancy detection circuit for, and method of, determining whether a predetermined adequate redundancy exists when the module is present in a system. In one embodiment, the module includes: (1) a sensor, associated with the module, that receives a signal that is a function of a number of modules present in the system and (2) a calculation circuit, coupled to the sensor, that determines from the signal whether a surplus capacity of the module provides at least the predetermined adequate redundancy for the system.

The present invention therefore introduces a decentralized way by which a module can determine the extent of the role it must play in the redundancy required in the system as a whole and whether it has sufficient surplus capacity to accept its role.

In one embodiment of the present invention, the system comprises a central circuit portion including a resistor ladder network, the module shorting a resistor in the resistor ladder network to alter the signal. Those skilled in the art are familiar with resistor ladder networks and their operation.

In one embodiment of the present invention, a voltage of the signal varies as a function of the number of the modules present in the system.

In one embodiment of the present invention, the sensor comprises an analog to digital converter that receives and converts the signal to a digital number and the calculation circuit comprises a processor, coupled to the analog to digital converter, that receives the digital number and a further digital number representing an output current of the module and determines therefrom whether the output exceeds a maximum threshold. Alternatively, the sensor and calculation circuit may be wholly analog in nature.

In one embodiment of the present invention, the module produces an electrical current, the surplus capacity of the module being a function of an amount by which a maximum current output of the module exceeds a sensed actual current output. The present invention is equally applicable, however, to all modular systems, not just those that produce electricity.

In one embodiment of the present invention, the predetermined adequate redundancy is based on N+1 redundancy. Those skilled in the art will readily perceive that the present invention is adaptable to other degrees of redundancy.

In one embodiment of the present invention, the module is a rectifier, the rectifier sharing a total output current of the system. In an embodiment to be illustrated and described, the present invention finds application in a modular rectifier wherein it is desired to operate the rectifiers at less than their full capacity to allow for the possibility that one of the rectifier modules may fail at least in part.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
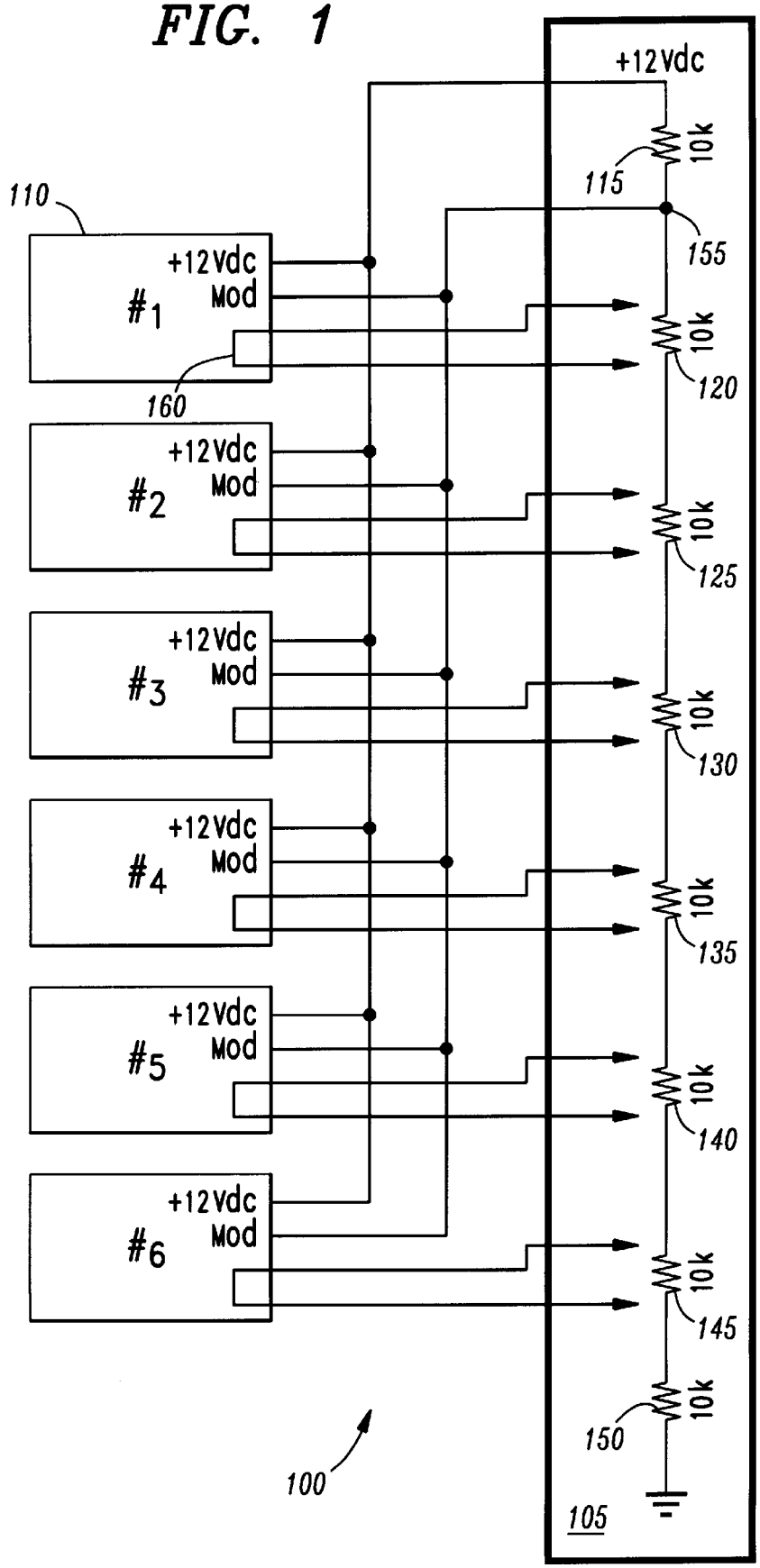
FIG. 1 illustrates a schematic diagram of an embodiment of a decentralized redundancy determination circuit constructed according to the principles of the present invention.

Referring initially to FIG. 1, illustrated is a schematic diagram of an embodiment of a modular rectifier system 100 constructed according to the principles of the present invention. The modular rectifier system 100 includes a central backplane or central circuit portion 105 and a plurality of rectifier modules (one of which is designated 110). The rectifier modules 110 each includes a redundancy detection circuit as illustrated and described with respect to FIG. 2.

In the illustrated embodiment of the present invention, the central backplane 105 includes a resistor ladder network having a first, second, third, fourth, fifth, sixth and seventh divider resistors 115, 120, 125, 130, 135, 140, 145, respectively, and a pull-down resistor 150. The resistor ladder network forms a voltage divider producing a signal at a node 155. When the rectifier modules 110 are plugged into the central backplane 105, each rectifier module 110 provides an isolated voltage source (e.g., 12 Vdc) to power the resistor ladder network. The signal at the node 155 is fed back to the rectifier modules 110. Each rectifier module 110 incorporates a shorting circuit 160 that shorts out one of the divider resistors (for instance, the second divider resistor 120) when the rectifier module 110 is plugged into the central backplane 105. Shorting out the second divider resistor 120 reduces the effective resistance of the lower portion of the voltage divider, changing a voltage of the signal at the node 155 reported to the rectifier modules 110. This voltage enables any one of the rectifier modules 110 to determine the total number of rectifier modules 110 physically connected to the central backplane 105.

Since the divider resistors 115, 120, 125, 130, 135, 140, 145 are all of the same value and arranged in series in the lower portion of the voltage divider, plugging the rectifier module 110 into any available position reduces the effective resistance of the lower leg of the voltage divider by the same amount, thereby producing the same result. Consistent design of the voltage dividers ensures that the signal indicating the number of rectifier modules 110 present is the same, independent of the configuration of the central backplane 105 or the total number of rectifier modules 110 used. Those skilled in the art should understand that while this implementation employs the voltage divider in the central backplane to vary the voltage of the signal at the node 155 as a function of the number of rectifier modules 110 present in the system, other methods of determining the number of rectifier modules 110 present in the system derived from a signal from the central backplane are well within the broad scope of the present invention.

Figure 2:
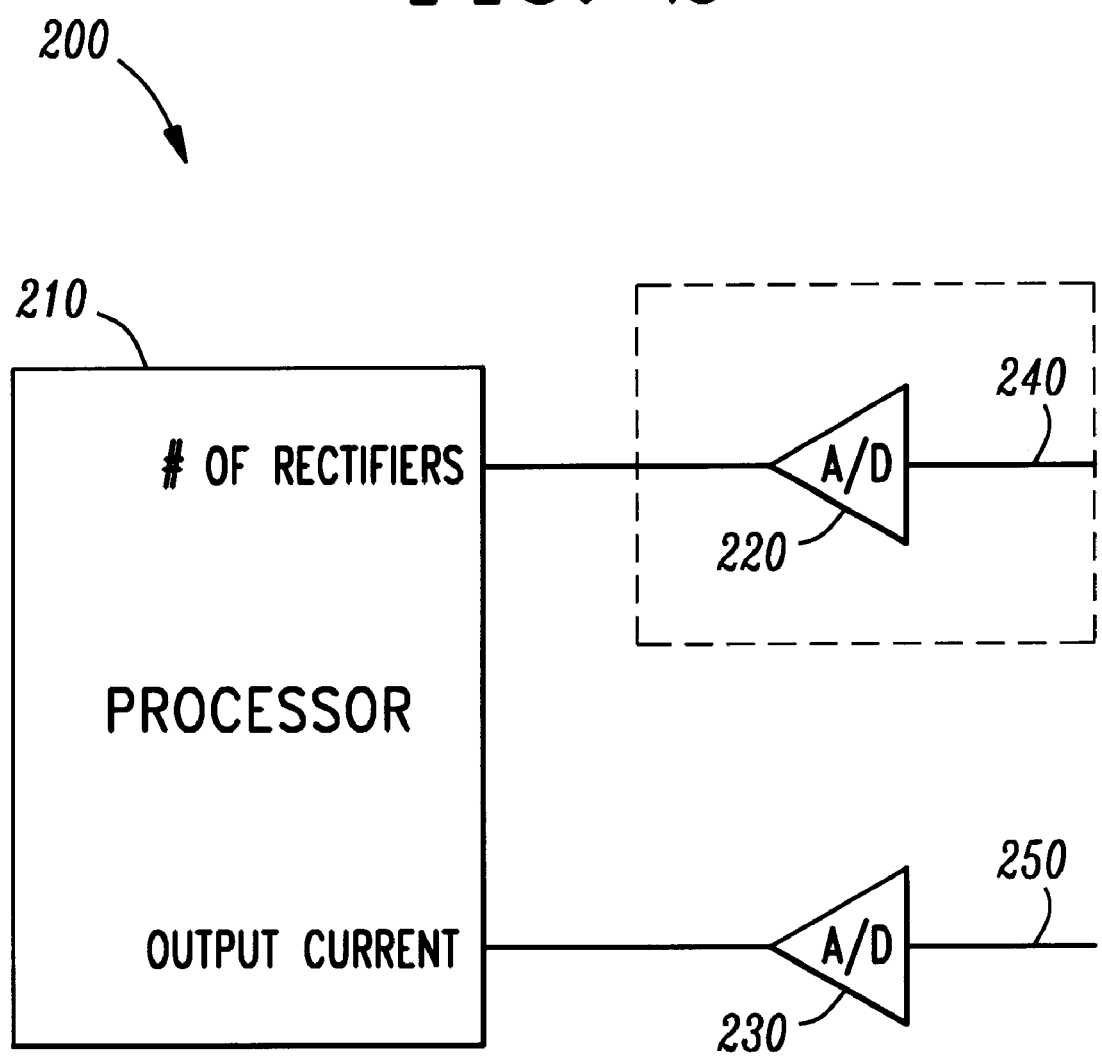
FIG. 2 illustrates a schematic diagram of a portion of a rectifier module employing a redundancy detection circuit constructed according to the principles of the present invention.

Turning now to FIG. 2, illustrated is a schematic diagram of a portion of the rectifier module employing an embodiment of a redundancy detection circuit 200 constructed according to the principles of the patented invention. The internally-implemented redundancy detection circuit 200 includes a calculation circuit (embodied in a processor 210), a sensor (including a first analog to digital converter 220 and a first sensed voltage input 240), a second analog to digital converter 230 and a second sensed voltage input 250. The first sensed voltage input 240 receives a signal that is a function of a number of rectifier modules present in a system employing the same. The second sensed voltage input 250 receives a signal representative of the output current of the rectifier module. While the calculation circuit embodied in the processor 210 employs a sequence of operating instructions (in conjunction with a memory storage device), the calculation circuit may also be embodied hardware, firmware, software or combinations thereof.

The first sensed voltage input 240 is converted to a first digital number by the first analog to digital converter 220 and transmitted to the processor 210. The processor 210 uses the digital representation of the first sensed voltage input 240 to determine the number of rectifier modules plugged into the central backplane (not shown). The second sensed voltage input 250 representing the sensed actual current output is converted to a second digital number by the second analog to digital converter 230 and transmitted to the processor 210. The processor 210 determines a surplus capacity of the rectifier module by comparing the sensed actual current output to a maximum current output of the module. The processor 210 then determines (e.g., using a look-up table), whether, given the number of rectifier modules in operation, the surplus capacity of the module provides at least a predetermined adequate redundancy. In this embodiment of the present invention, the predetermined adequate redundancy is based on n+1 redundancy wherein the system contains at least one more rectifier module than is required. Those skilled in the art should understand, however, that the use of other degrees of redundancy are well within the broad scope of the present invention. If the rectifier module fails to supply the predetermined adequate redundancy, an alarm circuit in the rectifier module provides an alarm indicating that the current output level exceeds the maximum threshold.

While the illustrated embodiment employs a processor to determine the number of rectifier modules present in the system and whether the current output level of a particular rectifier module exceeds the threshold, those skilled in the art should understand that the processor is presented for illustrative purposes only and other schemes for determining redundancy based on knowledge of the number of rectifier modules present in the system are well within the broad scope of the present invention. While the redundancy detection circuit has been described with respect to a modular rectifier system, the present invention is equally applicable to any modular system.

Although the present invention has been described in detail, those skilled in the art should understand that they can make various changes, substitutions and alterations herein without departing from the spirit and scope of the invention in its broadest form.

What is claimed is:

1. For use in a module, a redundancy detection circuit for determining whether a predetermined adequate redundancy exists when said module is present in a system, comprising:
   - a sensor, associated with said module, that receives a signal that is a function of a number of modules present in said system; and
   - a calculation circuit, coupled to said sensor, that determines from said signal whether a surplus capacity of said module provides at least said predetermined adequate redundancy for said system.

2. The redundancy detection circuit as recited in claim 1 wherein said system comprises a central circuit portion including a resistor ladder network, said module shorting a resistor in said resistor ladder network to alter said signal.

3. The redundancy detection circuit as recited in claim 1 wherein a voltage of said signal varies as a function of said number of said modules present in said system.

4. The redundancy detection circuit as recited in claim 1 wherein said sensor comprises an analog to digital converter that receives and converts said signal to a digital number and said calculation circuit comprises a processor, coupled to said analog to digital converter, that receives said digital number and a further digital number representing an output current of said module and determines therefrom whether said output exceeds a maximum threshold.

5. The redundancy detection circuit as recited in claim 1 wherein said module produces an electrical current, said surplus capacity of said module being a function of an amount by which a maximum current output of said module exceeds a sensed actual current output.

6. The redundancy detection circuit as recited in claim 1 wherein said predetermined adequate redundancy is based on N+1 redundancy.

7. The redundancy detection circuit as recited in claim 1 wherein said module is a rectifier, said rectifier sharing a total output current of said system.

8. For use in a module, a method of determining whether a predetermined adequate redundancy exists when said module is present in a system, comprising the steps of:
   - receiving a signal into said module that is a function of a number of modules present in said system; and
   - determining from said signal whether a surplus capacity of said module provides at least said predetermined adequate redundancy for said system.

9. The method as recited in claim 8 wherein said system comprises a central circuit portion including a resistor ladder network, said method comprising the steps of shorting a resistor in said resistor ladder network when said module is present in said system to alter said signal.

10. The method as recited in claim 8 further comprising the step of varying a voltage of said signal as a function of said number of said modules present in said system.

11. The method as recited in claim 8 wherein said step of receiving comprises the step of converting said signal to a digital number and said step of determining comprises the step of receiving a further digital number representing an output current of said module.

12. The method as recited in claim 8 wherein said module produces an electrical current, said surplus capacity of said module being a function of an amount by which a maximum current output of said module exceeds a sensed actual current output.

13. The method as recited in claim 8 wherein said predetermined adequate redundancy is based on N+1 redundancy.

14. The method as recited in claim 8 wherein said module is a rectifier, said method further comprising the step of sharing, by said module, a total output current of said system.

15. A modular rectifier, comprising:
   - a central backplane for communicating electrical power to and from rectifier modules, said central backplane developing a signal that is a function of a number of rectifier modules coupled to said backplane; and
   - a plurality of rectifier modules coupled to said backplane, each module including a redundancy detection circuit that receives said signal and determines therefrom and from a signal that is a function of an output current of said rectifier module whether a surplus capacity of said rectifier module provides at least a predetermined adequate redundancy with respect to said rectifier module.

16. The modular rectifier as recited in claim 15 wherein said backplane comprises a resistor ladder network, said rectifier module shorting a resistor in said resistor ladder network to alter said signal.

17. The modular rectifier as recited in claim 15 wherein said signal varies in voltage as a function of a number of said modules present in said system.

18. The modular rectifier as recited in claim 15 wherein said redundancy detection circuit comprises:
   - an analog to digital converter that receives and converts said signal to a digital number; and
   - a processor, coupled to said analog to digital converter, that receives said digital number and said signal that is a function of said output current of said rectifier module and determines therefrom whether said output exceeds a maximum threshold.

19. The modular rectifier as recited in claim 15 wherein said surplus capacity of said module is a function of an amount by which a maximum current output of said at least one of said modules exceeds a sensed actual current output and said redundancy detection circuit comprises an alarm circuit that provides an alarm if said surplus capacity of said rectifier module fails to provide at least said predetermined adequate redundancy.

20. The modular rectifier as recited in claim 15 wherein said predetermined adequate redundancy is based on N+1 redundancy.

* * * * *